United States Patent
Bogdan et al.

(10) Patent No.: US 10,454,332 B2
(45) Date of Patent: Oct. 22, 2019

(54) ACTIVE PART OF AN ELECTRIC MACHINE

(71) Applicant: SIEMENS AKTIENGESELLSCHAFT, München (DE)

(72) Inventors: Zolt Bogdan, Subotica (RS); Janos Iles, Subotica (RS); Andreas Lindmeier, Ruhstorf (DE); Norbert Schönbauer, Bad Füssing (DE); Mirjana Vukovic, Novi Zednik (RS); Robin Brenner, Passau (DE); Dominik Ratzisberger, Kösslarn (DE); Claus Teringl, Pocking (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 368 days.

(21) Appl. No.: 15/517,851

(22) PCT Filed: Oct. 2, 2015

(86) PCT No.: PCT/EP2015/072787
§ 371 (c)(1),
(2) Date: Apr. 7, 2017

(87) PCT Pub. No.: WO2016/055366
PCT Pub. Date: Apr. 14, 2016

(65) Prior Publication Data
US 2017/0310185 A1    Oct. 26, 2017

(30) Foreign Application Priority Data
Oct. 8, 2014 (EP) ..................................... 14188128

(51) Int. Cl.
*H02K 3/38* (2006.01)
*H02K 3/12* (2006.01)
(Continued)

(52) U.S. Cl.
CPC ................. *H02K 3/38* (2013.01); *H02K 3/12* (2013.01); *H02K 3/47* (2013.01); *H02K 15/0037* (2013.01)

(58) Field of Classification Search
CPC .. H02K 3/12; H02K 3/38; H02K 3/46; H02K 3/47; H02K 3/50; H02K 15/0037
See application file for complete search history.

(56) References Cited

U.S. PATENT DOCUMENTS 6,787,961 B2 * 9/2004 Neet ......................... H02K 3/12
                                                                310/201
7,064,470 B2 * 6/2006 Yokoyama ............... H02K 3/12
                                                                310/208

(Continued)

FOREIGN PATENT DOCUMENTS

DE  10 2010 039 871 A1    3/2012
DE  10 2012 214 523 A1    2/2014

(Continued)

*Primary Examiner* — Dang D Le
(74) *Attorney, Agent, or Firm* — Henry M. Feiereisen LLC

(57) ABSTRACT

An active part of an electric machine includes a plurality of coils, each having a sub-conductor. The coils are formed by windings of the sub-conductors thereof. The windings of a coil each have a predetermined winding length. In addition, the active part has a carrier part, in the grooves of which, the coils are arranged. The coils have a winding head region which projects from an end surface of the carrier part. The coils are also arranged in the form of a tiered winding. At least one of the coils has a V-shaped cross-section in the winding head region, as a result of an arrangement of its sub-conductor.

14 Claims, 3 Drawing Sheets

(51) Int. Cl.
*H02K 15/00* (2006.01)
*H02K 3/47* (2006.01)

(56) References Cited

U.S. PATENT DOCUMENTS

| | | |
|---|---|---|
| 8,629,596 B2 * | 1/2014 | Germishuizen .......... H02K 3/12 |
| | | 310/198 |
| 8,648,505 B2 | 2/2014 | Memminger et al. |
| 8,686,607 B2 | 4/2014 | Elender et al. |
| 9,276,446 B2 | 3/2016 | Schönbauer et al. |
| 9,450,458 B2 | 9/2016 | Brasas et al. |
| 2012/0169058 A1 | 7/2012 | Semmer |
| 2015/0042188 A1 | 2/2015 | Lutz et al. |

FOREIGN PATENT DOCUMENTS

| | | |
|---|---|---|
| EP | 2 493 056 A1 | 8/2012 |
| JP | H0171946 U | 5/1989 |
| JP | H1198740 A | 4/1999 |
| WO | WO 2011-006693 A2 | 1/2011 |

* cited by examiner

ACTIVE PART OF AN ELECTRIC MACHINE

CROSS-REFERENCES TO RELATED APPLICATIONS

This application is the U.S. National Stage of International Application No. PCT/EP2015/072787, filed Oct. 2, 2015, which designated the United States and has been published as International Publication No. WO 2016/055366 A1 which claims the priority of European Patent Application, Serial No. 14188128.4, filed Oct. 8, 2014, pursuant to 35 U.S.C. 119(a)-(d).

BACKGROUND OF THE INVENTION

The present invention relates to an active part of an electric machine. The active part has a plurality of coils which each have a sub-conductor, and a carrier part in whose grooves the coils are arranged. The coils are formed by windings of their sub-conductor, wherein the windings of a coil each have a pre-determined winding length. Furthermore, the coils have at least one winding overhang region which projects at an end face of the carrier part. Furthermore, the coils are arranged in the form of a tiered winding. The invention comprises, moreover, an electric machine having the inventive active part, and a method for producing this active part.

Electric machines, such as motors, generators and transformers, each have one or more active part(s) which are magnetically active. A motor, for example, has a stator and a rotor as the respective active part.

Coils can be inserted or wound into the stator and/or rotor of a motor or generator. The coils are then typically located in or on a laminated core. As a rule, the coils project from the end faces of the cylindrical or hollow cylindrical laminated cores and form a winding overhang of the rotor or stator. This laminated core can comprise a plurality of segments. The winding overhang of electric machines belongs to the magnetically inactive parts which do not contribute to torque formation.

The aim is therefore to keep the conductor length and the projection of the winding overhang as low as possible in order to avoid unnecessary space requirements, weight and losses.

FIG. 2 and FIG. 3 show, for example, a conventional winding overhang of a three-tiered winding, as is known from WO 2011/006693 A2. This means that here the coils 20 are located one above the other in three tiers or three levels. The three coils 20 project from a carrier part 22 on which the coils 20 are arranged in grooves. The three coils 20 each have an inclination in the tiered winding of 0 degrees (0°), 45 degrees (45°) and 90 degrees (90°) with respect to the longitudinal extension direction of the windings. The individual coils 20 initially exit perpendicularly from the end face S of the carrier part 22. The 90° coil is, as shown in the example of FIG. 1 and FIG. 2, curved perpendicularly downwards. The end of the 90° coil therefore runs parallel to the longitudinal axis of the active part 18 and the windings. The second coil, by contrast, runs at the end at a 45° angle to the end face S of the carrier part 22. The third coil, i.e. the 0° coil, runs in this sectional view in a straight line out of the end face S of the carrier part 22. The ends of each coil are produced by the arrangement of the windings of their sub-conductors 24. The arrangement of the windings of the sub-conductor 24 of a coil produces an inclined face at the end of the coil 20.

A stator of an electric machine emerges from JP H11 98740 A. The stator has a plurality of coils. Each coil has a plurality of sub-conductors. The coil is arranged in the grooves of a stator core. An end region of the coils projects at an end face of the stator core as a winding overhang. In the case of at least one coil the sub-conductors of this coil are arranged such that the coil has a V shape in the axial direction of the stator.

DE 10 2010 039 871 A1 describes an active part of an electric machine having oblique coils in the winding overhang region. The active part of the electric machine has a laminated core with an end face from which three coils project. Each of the three coils runs arcuately from the end face. Furthermore, the three coils are arranged in the winding overhang region inclined to the end face of the laminated core.

A coil of an electric machine emerges from JP H01 71946 U. The coil has a plurality of sub-conductors which are insulated from each other and are held together by a tape insulation.

SUMMARY OF THE INVENTION

The object of the invention is to form an active part of an electric machine and, in particular, the winding overhang region thereof, in a particularly compact manner.

This object is inventively achieved by the subject matters of the independent claims. Advantageous developments of the invention are produced by the features of the dependent claims.

This object is inventively achieved by an active part of an electric machine having a plurality of coils which each have a sub-conductor, and a carrier part in whose grooves the coils are arranged. The coils are formed by windings of their sub-conductors, wherein the windings of a coil each have a predetermined winding length. A sub-conductor can, for example, comprise one or more, in particular two, wire(s), it being possible for the wires of a sub-conductor to be arranged side by side. Furthermore, the coils have a winding overhang region which projects at an end face of the carrier part. Furthermore, the coils are arranged in the form of a tiered winding. In the winding overhang region at least one of the coils has a V shape in cross-section as a result of an arrangement of its sub-conductor. This produces the advantage that the conductor length in the winding overhang can be minimized and a compact active part can be produced. Furthermore, the overall length of the machine can be reduced so the weight and cost of the electric machine drop. Cross-section is here taken to mean a cutting plane which is oriented perpendicularly to the horizontal current flow direction. In other words, cross-section is here taken to mean the cross-sectional plane that extends in the longitudinal direction and, simultaneously, perpendicularly to the longitudinal direction of the active part. End face of the carrier part is, for example, taken to mean the face which extends at an end of the carrier part transversely to the longitudinal axis of the carrier part. A sub-conductor can comprise, for example, one or more, in particular two, wire(s). If a sub-conductor comprises, for example, two or more wire(s), the wires of a sub-conductor can be arranged side by side.

The coils inventively have a predefined minimum spacing from each other, wherein three of the coils each always have an inclination in the tiered winding of 0°, 45° and 90° with respect to the end face of the carrier part, wherein with the inclination of 45° the coil has a V shape in cross-section. A minimum spacing between the coils is here taken to mean the air gap between the coils. The coils can thereby also be arranged so as to be distributed in the winding overhang region in respect of their inclination. This has the advantage that even while maintaining the required air gap, the active part, i.e. the rotor or stator, can be formed more compactly since the 0° coil and the 90° coil can then also be arranged at an angle in cross-section in the winding overhang region. The inclination of the coils has a tolerance range between −25° and +25° in each case. Tolerance range is here taken to mean a positive or negative value of a deviation from the respective value of the angle of inclination of the coils with respect to the end face.

At least one coil is inventively constructed in a two-part form, wherein the coil is divided in the winding overhang region into a first coil part and into a second coil part, of which each forms a leg of the V shape and wherein the first and second coil parts are insulated independently of each other. In other words, at least one coil can be designed in two parts and be insulated in two parts. The advantage of this is that the coil length can be optimized further. The two-part embodiment of the insulation has the advantage that, due to the insulation of the coils, no cavities are formed.

The active part is preferably formed as a stator or rotor. The corresponding electric machine can therefore have a more compact construction than a machine having a conventional stator or rotor with conventional winding overhang design. The advantage of this is that the losses owing to a lower resistance drop due to a lower sub-conductor length, and the efficiency increases.

A different electrical resistance is produced since the three coils of the tiered winding can have different winding lengths. A further embodiment of the invention provides that pairwise from each other, the winding lengths of the coils have a difference of a maximum of 5%, in particular 3%. In other words, the difference cannot be more than 5%, in particular not more than 3%, between the winding lengths. The longest coil therefore determines the minimum length of the remaining coils. Winding length is taken to mean the length which would result for the entire conductor, i.e. the sub-conductor, of a coil if the sub-conductor of the coil was untwisted and completely unrolled. The advantage of this is that a uniform rotating field can be enabled.

The sub-conductors can advantageously have a sub-conductor insulation and the coils and/or the first coil part and the second coil part can each have a first tape insulation.

Furthermore, the first and second coil parts can be held together by means of a second tape insulation. A tape insulation is suitable for insulating electrical conductors, in particular for insulating windings of electric machines. For insulation of electrical conductors the insulating tape of the tape insulation can be wound around the conductor to be insulated in the form of relatively narrow strips or in the form of wide webs until the required thickness of the insulating sleeve to be produced is achieved. The term "tape insulation" should therefore be taken to mean narrow strips as well as wide strips.

An electric machine having an active part also forms part of the invention.

Furthermore, the invention comprises a method for producing an active part. Firstly, coils are arranged in grooves of a carrier part. A winding overhang region is formed at an end face of the carrier part. The coils have a winding overhang region which projects at an end face of the carrier part. Next the coils are arranged in the form of a tiered winding. In a final method step one of the coils is produced with a winding overhang region which has a V shape in cross-section.

At least one of the coils can advantageously be divided into a first coil part and a second coil part, wherein the first coil part and the second cool part are insulated independently of each other by means of a first tape insulation and are held together by means of a second tape insulation, whereby in cross-section a V shape is formed in the winding overhang region.

The advantages and developments described in connection with the inventive active part can also be transferred to the method for producing an active part.

BRIEF DESCRIPTION OF THE DRAWINGS

Exemplary embodiments of the invention are described below. In the drawings, in which.

DETAILED DESCRIPTION OF THE EMBODIMENTS

The exemplary embodiments described below are preferred embodiments of the invention. However, in the exemplary embodiments the described components of the embodiment each present individual features of the invention that should be considered independently of each other and which also each develop the invention independently of each other and should thereby also be regarded individually or in one of the illustrated combinations as a component of the invention. Furthermore, the described embodiments can also be supplemented by further features of the invention that have already been described.

Figure 1:
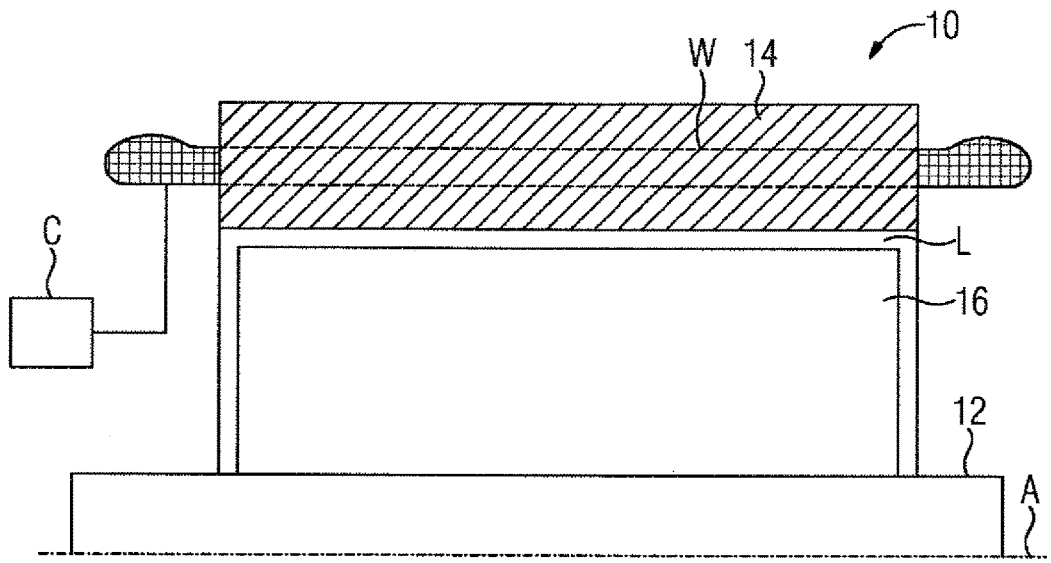
FIG. 1 shows a schematic diagram of a cross-section of an embodiment of the inventive electric machine.

FIG. 1 shows a general construction of an electric machine. The electric machine 10 can be, for example, a motor or a generator. In FIG. 1 an axis of rotation A also represents an axis of symmetry in the diagram. The electric machine 10 comprises a stator 14 in which windings W of electrical coils are arranged, with only one of the windings W being shown in FIG. 1. The windings W are supplied with alternating current by a three-phase current source C, so a magnetic rotating field is produced inside the stator 14 in an air gap L of the electric machine 10. The three-phase current source C can be, for example, an inverter or a fixed-frequency electrical grid.

Inside the stator 14 is located a rotor 16 which is connected to a shaft 12 so as to be torsion-resistant. The shaft 12 can be rotated about the axis of rotation A and is mounted in the stator 14. It can also be an external rotor, however. With an external rotor, the stator is arranged inside the rotor.

Figure 4:
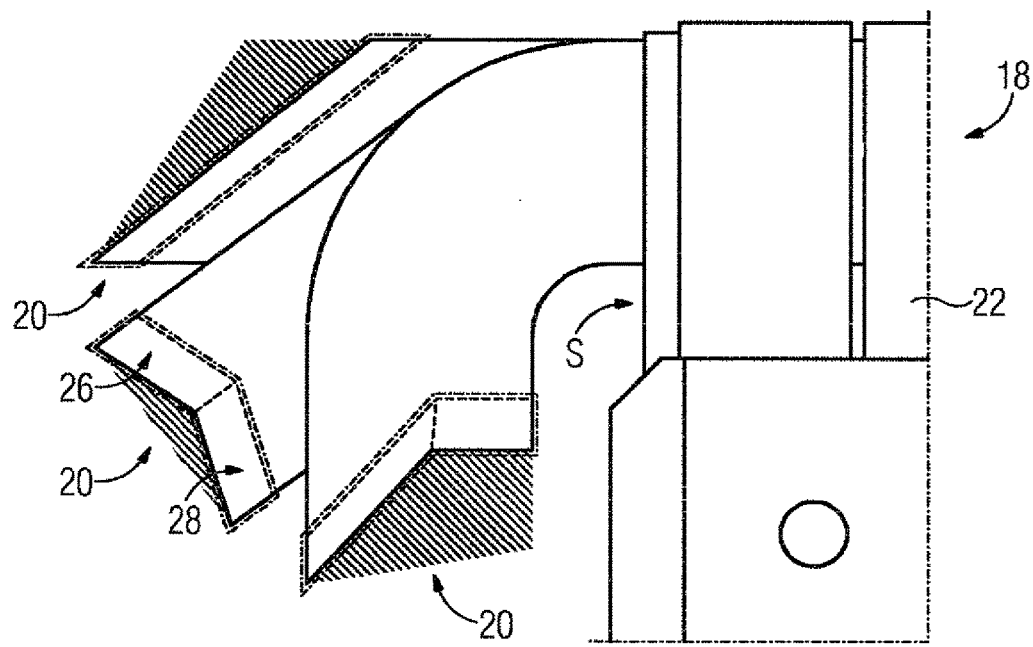
FIG. 4 shows a winding overhang of a three-tiered winding having coils inclined differently according to the present invention.

FIG. 4 shows the inventive active part 18 having a winding overhang of a three-tiered winding. The active part 18 can be, for example, a rotor or a stator. The active part 18 can also be applied, for example, to a cage rotor and/or slip ring rotor. In this case three coils 20 are located one above the other in three tiers or three planes. The three coils 20 project at the end face S from a carrier part 22 of the active part 18. The outermost end of each coil 20 has a specific arrangement in the winding overhang region, and this will be discussed in more detail below.

The individual coils 20 firstly exit perpendicularly from an end face S of the carrier part 22. The first coil is, as shown in FIG. 4, bent perpendicularly downwards. The first coil runs at the end at a 90° angle to the end face S of the carrier part 22. The plane of inclination, i.e. the inclination that the coil assumes in respect of the end face S, of the 90° coil runs parallel to the end face S and perpendicularly to the longitudinal axis of the active part 18. This coil will be called the 90° coil below. The second coil, by contrast, runs at a 45° angle to the end face S of the carrier part 22. In other words, the plane of inclination of the second coil runs at a 45° angle to the end face S. The third coil runs in a straight line out of the end face S of the carrier part 22. The plane of inclination of this coil therefore runs perpendicularly to the end face S of the carrier part 22 and therefore assumes an angle of inclination of 0°. The second and third coils will be called the 45° coils and 0° coil below.

As emerges from FIG. 4, the ends of all three coils 20 (90°, 45° and 0°) have different arrangements in the winding overhang region. This arrangement is produced by the arrangement of the sub-conductors 24. Each coil 20 has a sub-conductor 24. The coils 20 are formed by windings of their sub-conductors. At the end of each coil 20, which is formed by the arrangement of the windings of the sub-conductor 24 of each coil, the inclined face of the winding overhang regions therefore runs at a specific inclination with respect to the end face S of the carrier part 22. The 0° coil, 45° coil and 90° coil have an offset course, so the non-bent parts of the coil 20 have a parallel course.

Figure 3:
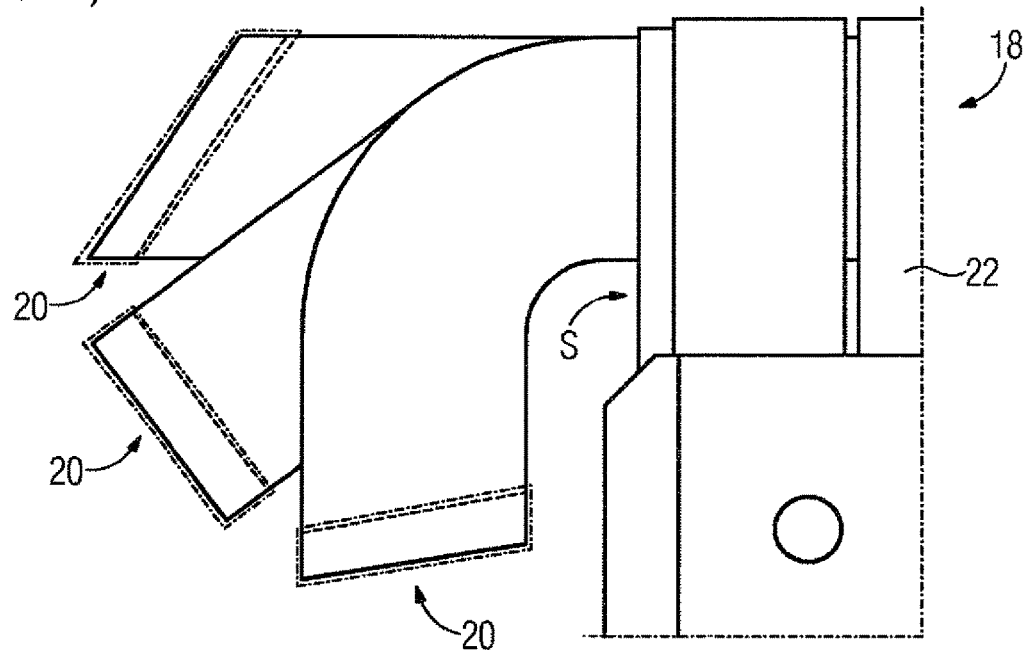
FIG. 3 shows a winding overhang of a three-tiered winding having coils inclined according to the prior art.

The 0° coil has at its end an inclined arrangement with respect to the horizontal axis of rotation, i.e. the longitudinal axis of the active part, or with respect to the plane of inclination of the 0° coil which extends perpendicularly to the end face S of the carrier part 22. The inclined arrangement in the winding overhang region of the 0° coil results due to an arrangement of the windings of its sub-conductor 24. The windings of the sub-conductor 24 of the 0° coil 20 are not located perpendicularly one above the other in respect of the horizontal axis or rotation or the plane of inclination of the 0° coil. Instead, the windings of the sub-conductor 24 are located obliquely one above the other with regard to the horizontal axis of rotation. At the end of the 0° coil 20, which is formed by the oblique arrangement of the windings of the sub-conductor 24 of the 0° coil, the inclined face of the winding overhang region runs at an inclination in the direction of the end face S of the carrier part 22 to the horizontal axis of rotation of 45°, in particular parallel to the 45° coil, i.e. constant air gap in the entire winding overhang. The hatched region, which is arranged at the end of the coils 20 in FIG. 4, which occurs with all three coils, constitutes the reduction in material which results due to the arrangement of the windings compared to the arrangement from the prior art according to FIG. 3. In other words, the specific arrangement of the windings of the sub-conductor 24 of each coil 20 means a shorter sub-conductor 24 can be used than would be necessary with an arrangement according to the prior art.

The contour at the end of the winding overhang region of the 45° coil is illustrated by an arrangement of its sub-conductor in a V shape in cross-section. To generate a contour of this kind, the windings of the sub-conductor 24 of the 45° coil are arranged accordingly. The 45° coil is designed in a two-part form. As also emerges from FIG. 5, in the winding overhang region the coil has a first coil part 26 and a second coil part 28. Each leg, i.e. the leg of the first coil part 26 and of the second coil part 28, forms a leg of the V shape. The windings of the sub-conductor 24 of the first coil part 26 and of the second coil part 28 are not located perpendicularly one above the other in respect of the 45° coil, which extends downwardly inclined at 45° with respect to the end face S of the carrier part 22. Instead, the windings of the sub-conductor 24 are located obliquely one above the other with regard to the 45° plane. The windings of the first coil part 26 are arranged one above the other such that the end forms a downwardly inclined face, i.e. counter to the direction of the 0° coil, with respect to the 0° plane which is oriented in the direction of the active part 18. Due to the oblique arrangement of the windings of the sub-conductor 24 one above the other, the second coil part 28, analogously to the first coil part 26, has an upwardly inclined face, i.e. in the direction of the 0° coil, with respect to the 0° plane, which is oriented in the direction of the active part 18. The windings of the sub-conductor 24 of the legs of the 45° coil are arranged in such a way that, together, they form a V shape.

The winding overhang region of the 90° coil also has a V shape in cross-section due to the arrangement of the windings of its sub-conductor 24. The windings of the sub-conductor 24 of the first coil part 26 of the 90° coil are located obliquely one above the other with regard to the 0° plane. The inclined face of the first coil part 26 matches the inclined face of the 0° coil. The inclined face of the first coil part 26 of the 90° coil has an inclination of 45° with respect to the end face S of the carrier part 22. In other words, the inclined face of the first coil part 26 of the 90° coil is arranged parallel to the inclined face of the 0° coil. The windings of the sub-conductor 24 of the second coil part 28 of the 90° coil are arranged side by side with regard to the 0° plane, so the inclined face of the second coil part 28 of the 90° coil runs parallel to the 0° plane. This means the windings of the sub-conductor 24 of the second coil part 28 of the 90° coil are arranged side by side on a horizontal line.

As emerges from FIG. 4, a sub-conductor 24 can also comprise, for example, a plurality of, in this case two, wires, wherein the wires of the sub-conductor 24 can be arranged side by side. The inclination of the coils can each have a tolerance range between −25° and +25°. Tolerance range is here taken to mean a positive or negative value of a difference from the respective value of the angle of inclination of the coil with respect to the end face.

Figure 5:
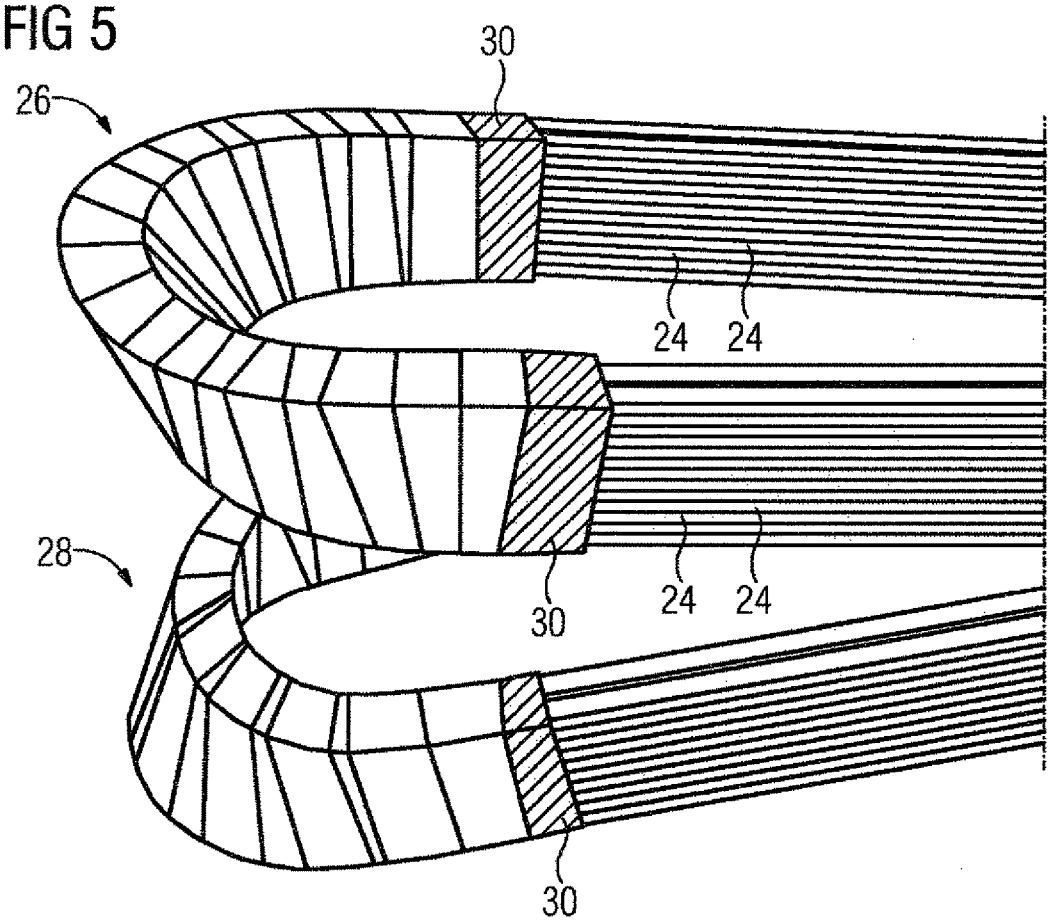
FIG. 5 shows a schematic diagram of a two-part coil having a V shape in cross-section in the winding overhang region.

As can be seen from FIG. 5, the first coil part 26 and the second coil part 28 are insulated independently of each other. Furthermore, it emerges from FIG. 5 that the first coil part 26 and the second coil part 28 have a first tape insulation 30.

Figure 6:
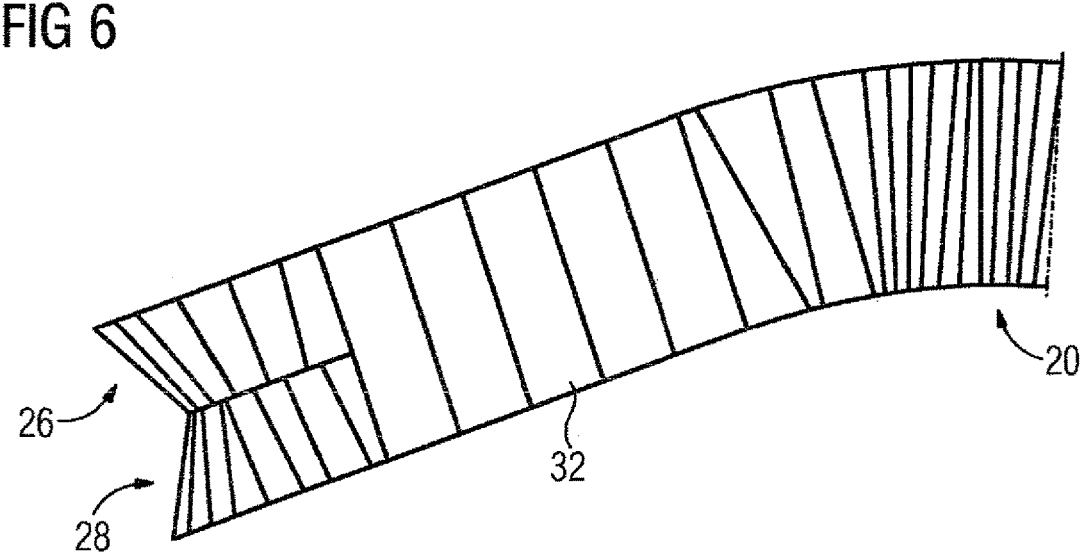
FIG. 6 shows a schematic diagram of a two-part coil having a V shape in cross-section in the winding overhang region.

FIG. 6 illustrates a schematic diagram of a coil having a V shape in cross-section of the winding overhang region. Here the first coil part 26 and the second coil part 28 are held together by means of a second tape insulation 32.

Figure 2:
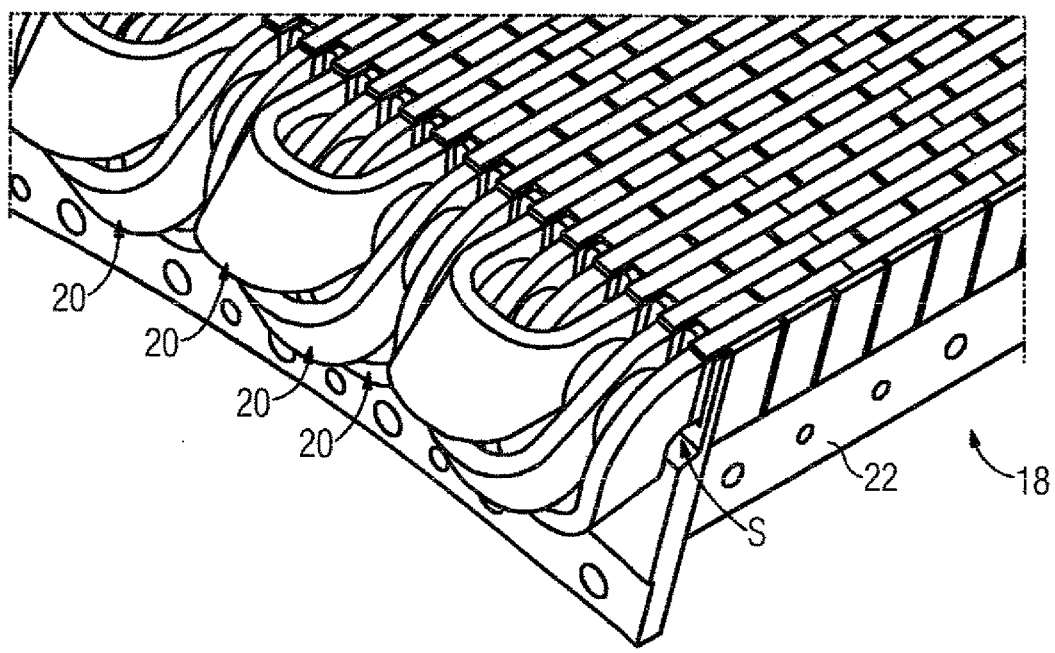
FIG. 2 shows a winding overhang of a three-tiered winding having coils inclined downwards according to the prior art.

Overall, an optimization of the winding overhang region therefore emerges with three phase developments due to a divided coil form. The winding overhang of electric machines belongs to the magnetically inactive parts that do not contribute to torque formation. The aim is therefore to keep the conductor length and the projection of the winding overhang as low as possible in order to avoid unnecessary space requirements, weight and losses. The exemplary embodiment shows a three-tiered winding. Since the three different coil types (e.g. 90°, 45° and 0°) of the tiered winding have different winding lengths, a different electrical resistance is produced. The difference cannot be more than 3% between the winding lengths. The longest coil therefore determines the minimum length of the remaining two coils. The geometry illustrated in FIG. 2 therefore results from the minimum spacings between the coils. If the coil was constructed in a V shape, the sub-conductor length could be optimized further. This is not possible with the current form of insulation since a cavity would otherwise result. If the coil is insulated in two parts, the coil length can be optimized further. A V shape, for example, of the coil can be produced. The conductor length in the winding overhang is minimized, and the losses drop and the efficiency increases as a result. The overall length of the machine is reduced, moreover, so weight and costs of the machine drop.

What is claimed is:

1. An active part of an electric machine, comprising:
    a plurality of coils arranged in the form of a tiered winding, each coil having a sub-conductor and formed by windings of the sub-conductor, with the windings of a corresponding one of the coils having a pre-determined winding length; and
    a carrier part having grooves for receiving the coils such that a winding overhang region of the coils projects at an end face of the carrier part, with at least one of the coils configured in a two-part form to define in the winding overhang region a first coil part and a second coil part which are arranged to form a V shape in cross-section and are insulated independently from each other,
    wherein the coils are distanced from each other by a pre-defined minimum spacing such that three of the coils in the tiered winding have in relation to the end face of the carrier part an inclination of 0°, 45° and 90°, respectively, with a tolerance range between −25° and +25°, with the one of the three coils at the 45° inclination having a V shape in cross-section.

2. The active part of claim 1, constructed in the form of a stator or a rotor.

3. The active part of claim 1, wherein the winding lengths of pairs of the coils have a difference of a maximum of 5% from each other.

4. The active part of claim 1, wherein the winding lengths of pairs of the coils have a difference of a maximum of 3% from each other.

5. The active part of claim 1, wherein the sub-conductors have a sub-conductor insulation, and the coils and/or the first coil part and the second coil part each have a tape insulation.

6. The active part of claim 1, further comprising a tape insulation configured to hold the first coil part and the second coil part together.

7. An electric machine, comprising an active part, said active part including a plurality of coils arranged in the form of a tiered winding, each coil having a sub-conductor and formed by windings of the sub-conductor, with the windings of a corresponding one of the coils having a pre-determined winding length, and a carrier part having grooves for receiving the coils such that a winding overhang region of the coils projects at an end face of the carrier part, with at least one of the coils configured in a two-part form to define in the winding overhang region a first coil part and a second coil part which are arranged to form a V shape in cross-section and are insulated independently from each other, wherein the coils are distanced from each other by a pre-defined minimum spacing such that three of the coils in the tiered winding have in relation to the end face of the carrier part an inclination of 0°, 45° and 90°, respectively, with a tolerance range between −25° and +25°, with the one of the three coils at the 45° inclination having a V shape in cross-section.

8. The electric machine of claim 7, wherein the active part is constructed in the form of a stator or a rotor.

9. The electric machine of claim 7, wherein the winding lengths of pairs of the coils have a difference of a maximum of 5% from each other.

10. The electric machine of claim 7, wherein the winding lengths of pairs of the coils have a difference of a maximum of 3% from each other.

11. The electric machine of claim 7, wherein the sub-conductors have a sub-conductor insulation, and the coils and/or the first coil part and the second coil part each have a tape insulation.

12. The electric machine of claim 7, further comprising a tape insulation configured to hold the first coil part and the second coil part together.

13. A method for producing an active part, comprising:
    arranging coils in grooves of a carrier part at a pre-defined minimum spacing from each other;
    forming each of the coils with a winding overhang region such as to project at an end face of the carrier part;
    arranging the coils in the form of a tiered winding such that three of the coils are arranged in the tiered winding with an inclination of 0°, 45° and 90° in relation to the end face of the carrier part, respectively, with a tolerance range between −25° and +25°;
    dividing at least one of the coils into a first coil part and into a second coil part such that the first and second coil parts form in the winding overhang region legs of a V shape in cross-section; and
    insulating the first and second coil parts insulated independently of each other by a tape insulation.

14. The method of claim 13, further comprising holding the first and second coil parts together by a second tape insulation, so as to form the V shape in cross-section in the winding overhang region.

* * * * *